(12) United States Patent
Chung et al.

(10) Patent No.: US 12,454,499 B2
(45) Date of Patent: Oct. 28, 2025

(54) FLUIDIZATION ENHANCERS FOR THE OXIDATIVE DEHYDROGENATION OF HYDROCARBONS

(71) Applicants: Dow Global Technologies LLC, Midland, MI (US); EcoCatalytic Inc., Woburn, MA (US)

(72) Inventors: Elena Y. Chung, Somerville, MA (US); John A. Sofranko, Woburn, MA (US); William K. Wang, Woburn, MA (US); Soumen Kundu, Pearland, TX (US); Hangyao Wang, Freeport, TX (US); Barry B. Fish, Freeport, TX (US); Matthew T. Pretz, Freeport, TX (US)

(73) Assignees: Dow Global Technologies LLC, Midland, MI (US); EcoCatalytic Inc., Woburn, MA (US)

( * ) Notice: Subject to any disclaimer, the term of this patent is extended or adjusted under 35 U.S.C. 154(b) by 0 days.

(21) Appl. No.: 17/800,756

(22) PCT Filed: Feb. 19, 2021

(86) PCT No.: PCT/US2021/018649
§ 371 (c)(1),
(2) Date: Aug. 18, 2022

(87) PCT Pub. No.: WO2021/168165
PCT Pub. Date: Aug. 26, 2021

(65) Prior Publication Data
US 2023/0089190 A1    Mar. 23, 2023

Related U.S. Application Data

(60) Provisional application No. 62/979,051, filed on Feb. 20, 2020.

(51) Int. Cl.
C07C 5/48    (2006.01)
C10G 27/04    (2006.01)

(52) U.S. Cl.
CPC ............ C07C 5/48 (2013.01); C10G 27/04 (2013.01); *C07C 2521/02* (2013.01);
(Continued)

(58) Field of Classification Search
CPC ... C07C 5/48; C07C 2521/02; C07C 2523/08; C07C 2523/14; C07C 2523/34; C10G 27/04; C10G 2400/20
See application file for complete search history.

(56) References Cited

U.S. PATENT DOCUMENTS 4,499,322 A    2/1985    Jones et al.
4,547,611 A    10/1985    Jones et al.
(Continued)

FOREIGN PATENT DOCUMENTS

EP    0254423 A2    1/1988
EP    0185548 A2    4/1990
(Continued)

OTHER PUBLICATIONS

Beckers et al. (Selective Hydrogen Oxidation in the Presence of C3Hydrocarbons Using Perovskite Oxygen Reservoirs, 2008, ChemPhyChem, 9, 1062-1068, see p. 1066). (Year: 2008).*
(Continued)

*Primary Examiner* — Youngsul Jeong
(74) *Attorney, Agent, or Firm* — Dinsmore & Shohl LLP

(57) ABSTRACT

A process for oxidative dehydrogenation of a hydrocarbon to produce an olefin and water may include contacting, in a fluidized bed, the hydrocarbon with a particulate material, which may include at least one oxygen transfer agent (OTA) and at least one fluidization enhancing additive. During at least a portion of contacting the hydrocarbon with the
(Continued)

particulate material, the fluidized bed may be at a temperature at or above a melting point of one or more materials of the oxygen transfer agent. Further, during at least a portion of contacting the hydrocarbon with the particulate material, a surface of at least a portion of the OTA may comprise a molten layer. The fluidization enhancing additive may not undergo reduction in the fluidized bed during contacting the hydrocarbon with the particulate material and may be present in an amount that maintains sufficient fluidization of the particulate material.

20 Claims, 5 Drawing Sheets

(52) U.S. Cl.
CPC ...... *C07C 2523/08* (2013.01); *C07C 2523/14* (2013.01); *C07C 2523/34* (2013.01); *C10G 2400/20* (2013.01)

(56) References Cited

U.S. PATENT DOCUMENTS

| | | | |
|---|---|---|---|
| 4,583,299 | A | 4/1986 | Brooks |
| 4,678,862 | A | 7/1987 | Mazurek |
| 4,777,313 | A | 10/1988 | Sofranko et al. |
| 5,286,691 | A | 2/1994 | Harandi et al. |
| 8,435,920 | B2* | 5/2013 | White .................... B01J 23/002 252/373 |
| 9,067,196 | B2* | 6/2015 | Ravichandran .......... B01J 29/06 |
| 9,751,079 | B2* | 9/2017 | Freer .......................... C07C 5/48 |
| 10,138,182 | B2* | 11/2018 | Sofranko ............. B01J 37/0036 |
| 2020/0002271 | A1 | 1/2020 | Chi et al. |

FOREIGN PATENT DOCUMENTS

| | | |
|---|---|---|
| JP | H05163262 A1 | 6/1993 |
| WO | 2004007594 A1 | 1/2004 |
| WO | 2016049144 A1 | 3/2016 |
| WO | 2018232133 A1 | 12/2018 |

OTHER PUBLICATIONS

Beckers et al. (Selective Hydrogen Oxidation in the Presence of C3 Hydrocarbons Using Perovskite Oxygen Reservoirs, 2008, ChemPhyChem, 9, 1062-1068) (Year: 2008).*

International Search Report and Written Opinion dated Aug. 16, 2021, pertaining to Int'l Patent Application No. PCT/US2021/018649, 15 pgs.

Gartner et al. "Oxidative Dehydrogenation of Ethane on Dynamically Rearranging Supported Chloride Catalysts" J. Am. Chem. Soc. 2014, 136, 12691-12701, 11 pgs.

Yusuf et al. "Effects of Sodium and Tungsten Promoters on Mg6MnO8-Based Core-Shell Redox Catalysts for Chemical Looping—Oxidative Dehydrogenation of Ethane" ACS Catal. 2019, 9, 3174-3186, 13 pgs.

Brenner "Fluidization Engineering: Chapter 3", Fluidization and Mapping of Regimes, 2nd edition, Daizo Kunni and Octave Levenspiel, Butterworth-Heinemann, 1991, pp. 88-91.

Geldart "Types of Gas Fluidization", Powder Technology, 7 (1973) 285-292.

Neal et al "On the Mechanistic Aspects of Mg6MnO8-Based Redox Catalysts for Oxidative Dehydrogenation of Ethane via Chemical Looping Scheme", AIChE Annual Meeting, San Francisco, Nov. 17, 2016.

Meier "Atlas of Zeolite Structure Types: Past—Present—Future", Catalysis and Adsorption by Zeolites, 1991, 10 pgs.

Kim et al. "Effect of Fines Content on Fluidity of FCC Catalysts for Stable Operation of Fluid Catalytic Cracking Unit", Energies, 2019, 12, 293.

Van Eyk et al. "Control of Agglomeration and Defluidization during Fluidized-Bed Combustion of South Australian Low-Rank Coals" Energy Fuels 2012, 26, 118-129.

Song et al. "Fluidization behavior of nano-particles by adding coarse particles", Advanced Powder Technology 20 (2009) 366-370.

Bhattacharya et al. "Control of Agglomeration and Defluidization Burning High-Alkali, High-Sulfur Lignites in a Small Fluidized Bed Combustor—Effect of Additive Size and Type, and the Role of Calcium", Energy & Fuels, 2003, 17, 1014-1021.

Brenner "Fluidization Engineering: Chapter 3", Fluidization and Mapping of Regimes, 2nd edition, Daizo Kunni and Octave Levenspiel, Butterworth-Heinemann, 1991, pp. 77-80.

Gartner et al. "Oxidative Dehydrogenation of Ethane: Common Principles and Mchanistic Aspects", ChemCatChem 2013, 5, 3196-3217.

Chinese Office Action dated Jan. 20, 2024, pertaining to CN Patent Application No. 2021800147220, 16 pgs.

Saudi Arabia Substantive Examination Report dated Sep. 25, 2023, pertaining to SA Patent Application No. 522440140, 15 pgs.

Kuwait Examination Report dated Jul. 22, 2024, pertaining to KW Patent Application No. KW/P/2022/001202, 5 pgs.

Chinese Office Action dated Sep. 11, 2024, pertaining to CN Patent Application No. 202180014722.0, 12 pgs.

Japanese Office Action dated Nov. 12, 2024, pertaining to JP Patent Application No. 2022-549970, 6 pgs.

Singapore Office Action dated Apr. 4, 2025, pertaining to SG Patent Application No. 11202251828Q, 7 pgs.

Brazilian Technical Report dated Apr. 29, 2025, pertaining to Brazilian Patent Application No. BR112022016179.4, 8 pgs.

Japanese Office Action dated Jul. 1, 2025, pertaining to JP Patent Application No. 2022-549970, 10 pgs.

Communication pursuant to Article 94(3) EPC dated Aug. 12, 2025, pertaining to EP Patent Application No. 21723454.1, 6 pgs.

* cited by examiner

FLUIDIZATION ENHANCERS FOR THE OXIDATIVE DEHYDROGENATION OF HYDROCARBONS

CROSS-REFERENCE TO RELATED APPLICATIONS

This application is a National Stage Entry under 35 U.S.C. § 371 of International Patent Application No. PCT/US2021/018649, filed Feb. 19, 2021, which claims the benefit of prior-filed provisional application No. 62/979,051, filed on Feb. 20, 2020, the entire contents of both of which are hereby incorporated by reference herein.

STATEMENT REGARDING FEDERALLY SPONSORED RESEARCH OR DEVELOPMENT

This invention was made with government support under Award Number DE-EE0008315 awarded by the U.S. Department of Energy. The government has certain rights in the invention.

TECHNICAL FIELD

Embodiments of the present disclosure generally relate to chemical processing and, more specifically, to olefin production by oxidative dehydrogenation.

BACKGROUND

Light olefins, e.g., ethylene and propylene, are important building blocks for manufacturing polymers, such as polyethylene, polypropylene, polystyrene, and many more polymers of commercial interest. Over 90% of the global olefin production comes from the high temperature steam cracking of naphtha or ethane and propane. The steam cracking process, which utilizes furnaces, is highly energy intensive, and 1.5 to 2 tons of carbon dioxide is produced for every ton of olefin product.

An alternative source of olefins is via the conversion of natural gas produced from shale deposits. Various technologies are being explored for converting one or more components of the natural gas into economically desirable olefins. One such reaction is the oxidative dehydrogenation of hydrocarbons to produce chemical species having a lesser degree of saturation and water, e.g., converting ethane into ethylene with water being produced. In one form of oxidative dehydrogenation, an oxygen transfer agent is used to provide an oxygen source for the reaction.

SUMMARY

It has been observed that, at elevated temperatures, oxygen transfer agents may not have sufficient fluidization within the reactor used for the reaction, leading to reduced yields of the desired product. Accordingly, there is a need for improved processes for olefin production using oxidative dehydrogenation in which sufficient fluidization is maintained in the reactor at elevated temperatures. According to one or more embodiments described herein, it has been found that including a fluidization enhancing additive with the oxygen transfer agent allows for sufficient fluidization of the oxygen transfer agents at reaction temperatures in the reactor.

According to aspects, a process for oxidative dehydrogenation of a hydrocarbon to produce an olefin and water includes contacting, in a fluidized bed, the hydrocarbon with a particulate material. The particulate material may include at least one oxygen transfer agent; and at least one fluidization enhancing additive consisting of inorganic materials. During at least a portion of the time of the contacting of the hydrocarbon with the particulate material, the fluidized bed is at a temperature at or above a melting point of one or more materials of the oxygen transfer agent. Further, during at least a portion of the time of the contacting of the hydrocarbon with the particulate material, a surface of at least a portion of the at least one oxygen transfer agent comprises a molten layer. The at least one fluidization enhancing additive does not undergo reduction in the fluidized bed during the contacting of the hydrocarbon with the particulate material at the temperature. The at least one fluidization enhancing additive is present in an amount that maintains sufficient fluidization of the particulate material.

It is to be understood that both the foregoing brief summary and the following detailed description present embodiments of the technology, and are intended to provide an overview or framework for understanding the nature and character of the technology as it is claimed. The accompanying drawings are included to provide a further understanding of the technology, and are incorporated into and constitute a part of this specification. The drawings illustrate various embodiments and, together with the description, serve to explain the principles and operations of the technology. Additionally, the drawings and descriptions are meant to be merely illustrative, and are not intended to limit the scope of the claims in any manner.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
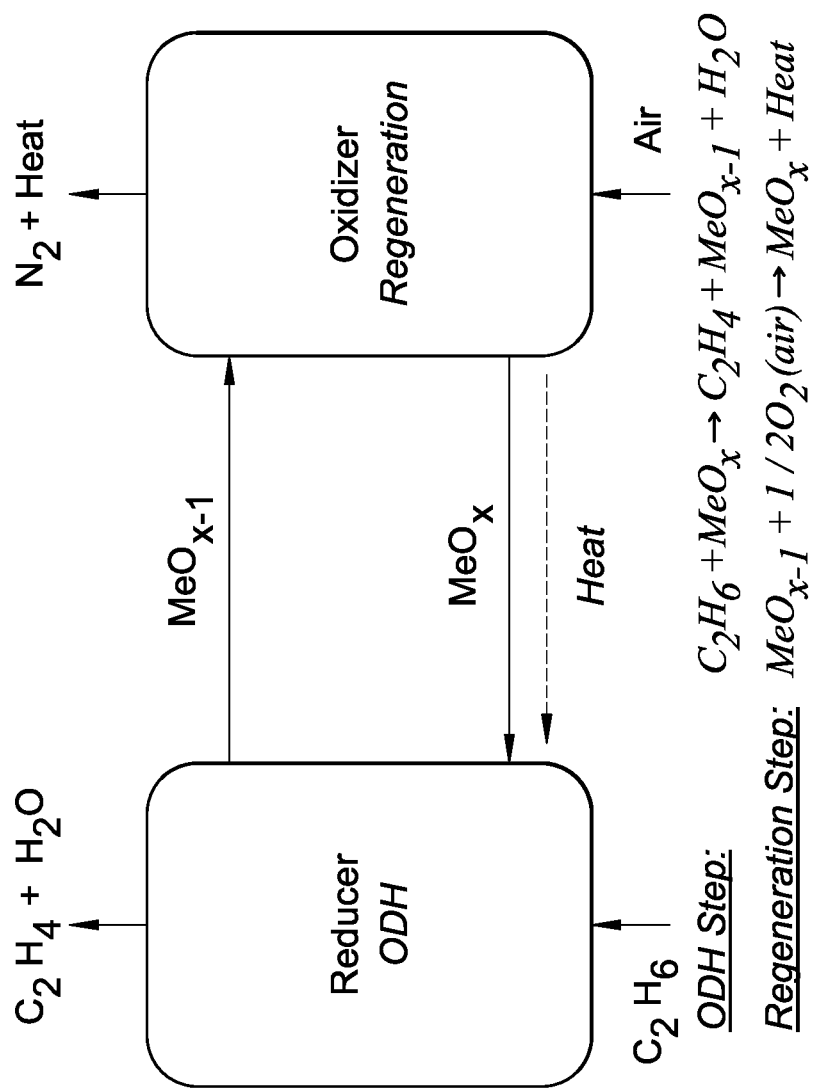
FIG. 1 shows the reduction/oxidation of an oxygen transfer agent with concurrent formation of useful products, in accordance with embodiments described herein.

According to one or more embodiments described herein, a process for oxidative dehydrogenation of a hydrocarbon to produce an olefin and water may include contacting, in a fluidized bed, the hydrocarbon with a particulate material comprising at least one oxygen transfer agent (hereinafter "OTA") and at least one fluidization enhancing additive consisting of inorganic materials. The process will now be described in further detail.

In one or more embodiments, the at least one fluidization enhancing additive is present in an amount sufficient to maintain fluidization of the particulate material. Fluidization within a reactor may exist on a continuum of gas-solid flow regimes. For example, when the fluid merely seeps through the void spaces between stationary particles, the resulting regime is known as "fixed bed." The fluidization may then proceed through some or all of an "expanded bed," "minimum fluidization," "smooth fluidization," "bubbling fluidization," "slugging fluidization," a "turbulent fluidization," "dense phase fluidization," "spouting bed fluidization," "channeling," "lean phase fluidization," "fast fluidization," and "dilute transport fluidization." These various types of fluidization are described in more detail in Jakobsen H. A. (2009) Fluidized Bed Reactors. In: Chemical Reactor Modeling. Springer, Berlin, Heidelberg. https://doi.org/10.1007/978-3-540-68622-4_10. As used herein, the term "fluidized bed" refers to a reactor that behaves as possessing minimum fluidization. When no fluidization enhancing additive is included, the reactor may resemble a fixed bed reactor due to agglomeration of the OTA at the reaction temperatures that are otherwise desirable for oxidative dehydrogenation. However, addition of the fluidization enhancing additives may maintain a minimum fluidization in which the particulate material is suspended within the reactor. As used herein, the term "maintain" includes situations in which the fluidization stays the same upon addition of the fluidization enhancing additives, situations in which the fluidization increases upon addition of the fluidization enhancing additives, and situations in which the fluidization decreases somewhat but not below a minimum fluidization. Thus, the fluidization enhancing additive may prevent the reactor from behaving as a fixed bed reactor, which significantly interferes with the oxidative dehydrogenation reaction. In some embodiments, the reactor may exist in a fast flow regime in which there is a continuous, gradual decrease in solids content over the height of the reactor and there is no clear interface between a dense bed of the particulate material and the liquid within the reactor.

As described herein, oxidative dehydrogenation (hereinafter "ODH") may be utilized to form olefins. In one or more embodiments, ODH of hydrocarbons, e.g. paraffins, offers an olefin production route that can significantly reduce $CO_2$ emissions and virtually eliminate NOx emissions from world scale plants relative to conventional olefin production routes. ODH is an exothermic, selective catalytic process that produces primarily olefins and water as products. Reaction scheme (1) provides the general ODH reaction:

$$zC_nH_{2n+2-2\beta}+(z-1+\delta)[O]\rightarrow C_{z\times n}H_{2(z\times n)+2-2\beta-2\delta}+(z-1+\delta)H_2O \quad (1)$$

where z=the number of reacting paraffin molecules; n=the number of atomic units in the reacting molecule; β=the degree of unsaturation where the value is zero for single bonds, one for double bonds and molecular rings, and two for triple bonds; and δ=the change in the degree of unsaturation. The oxygen, [O] in reaction scheme (1) may be supplied by the reduction of a metal oxide or via the catalytic use of molecular oxygen. The reaction shown in reaction scheme (1) is known as the "oxidative coupling of methane" when n=1. Reaction scheme (2) shows an exemplary oxidative dehydrogenation of ethane to ethylene, i.e., the reaction when n=2. As noted above, the reaction is exothermic, producing 105 kJ of heat per mole of ethane converted.

$$CH_3CH_3+\tfrac{1}{2}O_2\rightarrow CH_2CH_2+H_2O \quad \Delta H°=-105\ \text{kJ/mol} \quad (2)$$

The ODH reaction may take place in the presence of a particulate material that includes at least one OTA and at least one fluidization enhancing additive. In some embodiments the at least one OTA and the at least one fluidization enhancing additive are separate particles in the particulate material. In some embodiments, the particulate material includes particles combining the at least one oxygen transfer agent and the at least one fluidization enhancing additive. Both the OTA and the fluidization enhancing additive will now be described in further detail.

While promoting the conversion of hydrocarbons according to any of the reactions of reaction scheme (1), the OTA is reduced from an oxidized state to a less oxidized, reduced, state. In order to regenerate the OTA, oxygen may be used to re-oxidize the reduced OTA. This re-oxidation process may occur concurrent with the reduction of the oxygen transfer agent in the presence of one or more oxidation agent(s) such as oxygen, air, carbon dioxide, steam, NOx, and/or oxides of sulfur. Alternatively, the OTA may be re-oxidized in a separate step. This reduction/oxidation of the OTA with concurrent formation of useful products, which is schematically illustrated in FIG. 1, is often described as a redox or chemical looping system. In embodiments, the OTA may include a compound that undergoes reduction during the ODH, thereby providing oxygen for formation of water.

In embodiments, the surface of at least a portion of the OTA comprises a molten layer for at least a portion of the time during which the hydrocarbon is contacted with the particulate material. The molten layer may comprise from 1% to 100% of the surface area of the outer surface of the OTA, such as from 1% to 95%, from 1% to 90%, from 1% to 85%, from 1% to 80%, from 1% to 75%, from 1% to 70%, from 1% to 65%, from 1% to 60%, from 1% to 55%, from 1% to 50%, from 1% to 45%, from 1% to 40%, from 1% to 35%, from 1% to 30%, from 1% to 25%, from 1% to 20%, from 1% to 15%, from 1% to 10%, from 5% to 95%, from 10% to 95%, from 15% to 95%, from 20% to 95%, from 25% to 95%, from 30% to 95%, from 35% to 95%, from 40% to 95%, from 45% to 95%, from 50% to 95%, from 55% to 95%, from 60% to 95%, from 65% to 95%, from 70% to 95%, from 75% to 95%, from 80% to 95%, or even from 85% to 95% of the surface area of the outer surface of the OTA. Without being bound by theory, it is believed that the molten layer formation takes place when the OTA is exposed to temperatures near or greater than the melting point of the material of the OTA. Such temperature may be present in the fluidized bed reactor, such as at least 450° C.

In embodiments, the OTA may include an alkali metal and at least one of a mixed oxide of at least one metal that, when contacted with a hydrocarbon, is capable of oxidizing the hydrocarbon to a more unsaturated state or that couples carbon-carbon bonds with the formation of water as in reaction scheme (1); and a mixed oxide of at least one metal that, when contacted with hydrogen, is capable of hydrogen oxidation. The OTA may additionally include boron.

The mixed oxides included in the oxygen transfer agents may be prepared from materials that come from a family of cubic crystal lattice, $R_6R'O_8$, wherein R and R' are different elements and O is oxygen. These materials are solid solutions of R' in R and have been observed to show very little crystal lattice parameter change upon reduction or re-oxidation, thus making them dimensionally stable as OTAs. Examples of materials include $Mg_6MnO_8$, $Cu_6PbO_8$, and $Ni_6MnO_8$. In embodiments, the at least one OTA may include a mixed oxide comprising $Mg_6MnO_8$. In addition to stable crystal structures upon redox cycles, these $R_6R'O_8$ materials may be prepared in a way that yields very dense, hard, substrates. The addition of small amounts of boron may greatly increase the particle toughness.

In embodiments, the OTA may include at least one reducible metal-containing oxide; at least one alkali metal species; at least one boron-containing species; and at least one alkaline earth metal-containing species. The at least one reducible metal-containing oxide may be selected from the group consisting of manganese oxide, tin oxide, indium oxide, germanium oxide, lead oxide, antimony oxide, bismuth oxide, praseodymium oxide, terbium oxide, cerium oxide, iron oxide, ruthenium oxide, and a combination of two or more thereof. The alkali metal species may include elemental alkali metal or a compound comprising the alkali metal. The boron-containing species may include elemental boron or a compound comprising boron. The alkaline earth metal-containing species may include elemental alkaline earth metal or a compound comprising alkaline earth metal.

In embodiments, the OTA may include a mixed oxide having the formula $ML_aB_bC_cO_x$, where M is manganese, tin, indium, germanium, lead, antimony, bismuth, praseodymium, terbium, cerium, iron, ruthenium, or a combination of two or more thereof; L is at least one alkali metal; B is boron; C is at least one alkaline earth metal; O is oxygen; a is from 0.01 to 10; b is from 0.1 to 20; c is from 0.1 to 100; and x is a number of oxygen atoms required due to valence states of M, L, B, and C.

In other embodiments, the OTA may include a mixed oxide having the formula $MB_bC_cO_x$, where M is manganese, tin, indium, germanium, lead, antimony, bismuth, praseodymium, terbium, cerium, iron, ruthenium, or a combination of two or more thereof; B is boron; C is at least one alkaline earth metal; O is oxygen; a is from 0.01 to 10; b is from 0.1 to 20; c is from 0.1 to 100; and x is a number of oxygen atoms required due to valence states of M, B, and C.

In embodiments, the OTA may include a perovskite, which is a mineral having a structure of $ABX_3$, where A and B are cations and X is an anion, e.g., oxide, that forms bonds to both cations. Exemplary perovskites include $CaMnO_3$, $BaMnO_{3-\delta}$, $SrMnO_{3-\delta}$, $Mn_2SiO_4$, $Mn_2MgO_{4-\delta}$, $La_{0.8}Sr_{0.2}La_{0.8}FeO_{3-\delta}$, $Ca_9Ti_{0.1}Mn_{0.9}O_{3-\delta}$, $Pr_6O_{11-\delta}$, or a combination of two or more thereof.

In embodiments, the OTA may further include one or more promoters, which promote higher selectivity to specific desired products. While not wishing to be bound by any particular theory, it is believed that active oxygen is drawn to the promoter sites within the OTA, enabling the OTA to act as a selective promoter of reaction scheme (1) and as an oxygen reservoir to the selective promoting agent. Exemplary promotors may include, for example, monometallic and mixed metallic oxides of Fe, Co, La, Sr, Sm, Pr, Y, Ga, Ce, Zr, Ti, W, Mo, V, Nb, and Cr, and dopants, such as Ni, Sn, Ga, W, Zr, Na, K, Cs, Rb, As, Sb, Bi, and P. Other promoters may include silicates or aluminates of alkali metals or alkaline earth metals, such as silicates and aluminates of sodium, lithium, calcium, and barium. In addition, silicates and aluminates of manganese (braunite), iron, zirconium, copper or ruthenium may be used. Another class of oxygen flux promoters that may be used includes oxides with hole structures that promote oxygen anion transport such as cerium oxide, zinc oxide, zirconium oxide (with or without additives such as yttrium), praseodymium oxide, or barium oxide. In embodiments, the promoter includes tungsten and an alkali metal, an alkaline earth metal, or a combination of the alkali metal and the alkaline earth metal.

In embodiments, the particle size of the OTA may be from 10 μm to 200 μm, from 10 μm to 190 μm, from 10 μm to 180 μm, from 10 μm to 170 μm, from 10 μm to 160 μm, from 10 μm to 150 μm, from 10 μm to 140 μm, from 10 μm to 130 μm, from 10 μm to 120 μm, from 10 μm to 110 μm, from 10 μm to 100 μm, from 10 μm to 90 μm, from 10 μm to 80 μm, from 10 μm to 70 μm, from 10 μm to 60 μm, from 10 μm to 50 μm, from 10 μm to 40 μm, from 10 μm to 30 μm, from 10 μm to 20 μm, from 20 μm to 200 μm, from 30 μm to 200 μm, from 40 μm to 200 μm, from 50 μm to 200 μm, from 60 μm to 200 μm, from 70 μm to 200 μm, from 80 μm to 200 μm, from 90 μm to 200 μm, from 100 μm to 200 μm, from 110 μm to 200 μm, from 120 μm to 200 μm, from 130 μm to 200 μm, from 140 μm to 200 μm, from 150 μm to 200 μm, from 160 μm to 200 μm, from 170 μm to 200 μm, from 180 μm to 200 μm, or even from 190 μm to 200 μm. Particle size distribution may be measured in water dispersants using ASTM method D4464-15, the entire content of which is incorporated by reference herein, with a particle refractive index of 1.730. Instrumentation for performing the measurement may include, for example, a Mastersizer 2000.

In one or more embodiments, the OTA may exhibit properties known in the industry as "Geldart A" properties. In other embodiments, the OTA may exhibit properties known in the industry as "Geldart B" properties. Particle type may be classified as "Group A" or "Group B" according to D. Geldart, Gas Fluidization Technology, John Wiley & Sons (New York, 1986), 34-37; and D. Geldart, "Types of Gas Fluidization," Powder Technol. 7 (1973) 285-292, which are incorporated herein by reference in their entireties.

As used herein, the term "Group A" refers to an aeratable powder having a bubble-free range of fluidization; a high bed expansion; a slow and linear deaeration rate; bubble properties that may include a predominance of splitting/recoalescing bubbles, with a maximum bubble size and large wake; high levels of solids mixing and gas backmixing, assuming equal U-Umf (U is the velocity of the carrier gas, and Umf is the minimum fluidization velocity, typically though not necessarily measured in meters per second, m/s, i.e., there is excess gas velocity); axisymmetric slug properties; and no spouting, except in very shallow beds. The properties listed tend to improve as the mean particle size decreases, assuming equal particle size (dp); or as the proportion of the particles having dp less than 45 μm is increased; or as pressure, temperature, viscosity, and density of the gas increase. In general, the particles may exhibit a small mean particle size and/or low particle density (ρp) (<1.4 grams per cubic centimeter, g/cm$^3$), fluidize easily, with smooth fluidization at low gas velocities, and may exhibit controlled bubbling with small bubbles at higher gas velocities.

As used herein, the term "Group B" refers to a "sand-like" powder that starts bubbling at Umf; exhibits moderate bed expansion; exhibits a fast deaeration; has no limits on bubble size; has moderate levels of solids mixing and gas backmixing, assuming equal U-Umf; includes both axisymmetric and asymmetric slugs; and exhibits spouting in only shallow beds. These properties tend to improve as mean particle size decreases, but particle size distribution and, with some uncertainty, pressure, temperature, viscosity, or density of gas seem to do little to improve them. In general, when most of the Group B particles have a particle size (dp) of 40 μm<dp<500 μm, the density (ρp) is 1.4<ρp<4 g/cm$^3$. When dp is 60 μm<dp<500 μm, the pp is 4 g/cm$^3$, and when dp is 250 μm<dp<100 μm, the density (ρp) is about 1 g/cm$^3$.

Fluidization of particles of the Geldart A and Geldart B size, such as the OTAs described herein, may be improved by the introduction of fine particles of size 10 μm to 200 μm. Inter-particle agglomeration caused by surface adhesion between particles is controlled according to embodiments described herein by introducing the fluidization enhancing additive. In this manner, OTAs that are impractical for oxidative dehydrogenation without the fluidization enhancing additive may be made practical for use in fluid and moving bed reactors. Similarly, the fluidization enhancing additive may allow for particle size adjustment. Therefore, if manufacturing methods used to produce the OTA do not efficiently yield the desirable range of particle sizes, fluidization enhancing additives may be added to the forming OTA during manufacture.

The fluidization enhancing additive will now be described in further detail. The at least one fluidization enhancing additive may not undergo reduction in the fluidized bed during the contacting of the hydrocarbon with the particulate material. Exemplary fluidization enhancing additives include non-reducible oxides, zeolites, clays, fluid catalytic cracking catalysts, and combinations of two or more thereof. Further exemplary fluidization enhancing additives include non-reducible oxides comprising an inorganic material that includes a chemical species selected from alumina, silica, silicon carbide, metal carbide, metal nitride, titanium dioxide, alkaline earth metal oxide, alkali sulfate, alkaline earth sulfate, calcium sulfate, hydrates of calcium sulfate, alkali carbonate, alkaline earth carbonate, lanthanum oxide, rare earth metal oxide, boric acid, salts of boric acid, boric oxide, zinc oxide, cerium oxide, gallium oxide, and a combination of two or more thereof.

In embodiments, the fluidization enhancing additive may include a zeolite, such as a zeolite of the formula $M_{2/n}O \cdot Al_2O_3 \cdot ySiO_2 \cdot wH_2O$ where y is an integer from 2 to 1,000,000,000; n is a valence of a cationic portion of the at least one zeolite; M is a metal selected from the group consisting of Zr, Mg, Ti, and a combination of two or more thereof; and w is a number of water molecules per zeolite unit structure, such that at least 5% of n is due to proton charge. For example, the zeolite may include zeolite Y, zeolite A, faujasite, bentonite, sodalite, ZSM-10, MCM-68, MCM-61, MCM-35, ZSM-39, ZSM-23, ZSM-12, SAPO 56, AlPO-5, AlPO-14, AlPO-41, or a combination of two or more thereof.

In embodiments, the fluidization enhancing additive may include a fluid catalytic cracking (hereinafter "FCC") catalyst. As described herein, FCC catalysts are those materials generally known to have cracking catalytic functionality. However, it should be understood that such FCC catalysts as described herein may not operate with cracking functionality in the systems and methods presently disclosed (i.e., they may be sufficiently inert). FCC catalysts may include a crystalline zeolite, a matrix, a binder, and a filler. In general, the zeolite, for example a Y-type zeolite, is the active species and may contribute from about 15 to 50 weight percent of the catalyst. An exemplary matrix is alumina, which may also contribute catalytic activity sites. The binder and filler components, for example silica sol and kaolin, respectively, may provide the physical strength of the catalyst. For use as a fluidization enhancing additive, the fluid catalytic cracking catalyst may be fresh, equilibrated, and/or stabilized. As used herein, the term "fresh catalyst" refers to a catalyst that has not yet been used in an FCC process. As used herein, the term "equilibrated catalyst" refers to a catalyst that has been used in an FCC process and has lost more than 50% of its activity relative to its activity as a fresh catalyst. As used herein, the term "stabilized catalyst" refers to an FCC catalyst that contains an additive or that the zeolite of which has been modified to promote stability, such that the activity of the FCC catalyst is greater than the activity of an otherwise identical non-stabilized FCC catalyst.

In embodiments, the particle size of the fluidization enhancing additive may be from 10 μm to 200 μm, from 10 μm to 190 μm, from 10 μm to 180 μm, from 10 μm to 170 μm, from 10 μm to 160 μm, from 10 μm to 150 μm, from 10 μm to 140 μm, from 10 μm to 130 μm, from 10 μm to 120 μm, from 10 μm to 110 μm, from 10 μm to 100 μm, from 10 μm to 90 μm, from 10 μm to 80 μm, from 10 μm to 70 μm, from 10 μm to 60 μm, from 10 μm to 50 μm, from 10 μm to 40 μm, from 10 μm to 30 μm, from 10 μm to 20 μm, from 20 μm to 200 μm, from 30 μm to 200 μm, from 40 μm to 200 μm, from 50 μm to 200 μm, from 60 μm to 200 μm, from 70 μm to 200 μm, from 80 μm to 200 μm, from 90 μm to 200 μm, from 100 μm to 200 μm, from 110 μm to 200 μm, from 120 μm to 200 μm, from 130 μm to 200 μm, from 140 μm to 200 μm, from 150 μm to 200 μm, from 160 μm to 200 μm, from 170 μm to 200 μm, from 180 μm to 200 μm, or even from 190 μm to 200 μm.

The OTAs and fluidization enhancing additives described herein may be used in a process of oxidative dehydrogenation of a hydrocarbon. In embodiments, a particulate material that includes both the OTA and the fluidization enhancing additives may be added to a fluidized bed reactor in which the hydrocarbon may come into contact with the particulate material. In other embodiments, the particulate material may include the OTA, but the fluidization enhancing additives may be separately added to the fluidized bed reactor. As described above, the fluidization enhancing additive may maintain fluidization within the reactor, such that the reactor does not behave as a fixed bed reactor.

In embodiments, the weight ratio of the OTA to fluidization enhancing additive may be from 50:50 to 99:1, from 50:50 to 95:5, from 50:50 to 90:10, from 50:50 to 85:15, from 50:50 to 80:20, from 50:50 to 75:25, from 50:50 to 70:30, from 50:50 to 65:35, from 50:50 to 60:40, from 55:45 to 99:1:10, from 60:40 to 99:1, from 65:35 to 99:1, from 70:30 to 99:1, from 75:25 to 99:1, from 80:20 to 99:1, from 85:15 to 99:1, from 90:10 to 99:1, or even from 95:5 to 99:1. Without intending to be bound by any particular theory, it is believed that when the concentration of fluidization enhancing additive is too high, the OTA may not be able to perform its function in the oxidative dehydrogenation or at least may be impeded to a large extent. However, when the concentration of the fluidization enhancing additive is too low, fluidization suffers for the reasons fully described above.

During at least a portion of the time of the contacting of the hydrocarbon with the particulate material, the fluidized bed is at a temperature at or above a melting point of one or more materials of the OTA. As used herein, the term "temperature" refers to an average temperature within the fluidized bed reactor while the hydrocarbon is in contact with the OTA and fluidization enhancing additive. In embodiments, the temperature is at least 350° C. In embodiments, the temperature is at least 450° C. In embodiments, the temperature is at least 650° C. For instance, the temperature may be from 650° C. to 1500° C., from 650° C. to 1450° C., from 650° C. to 1400° C., from 650° C. to 1350° C., from 650° C. to 1300° C., from 650° C. to 1250° C., from 650° C. to 1200° C., from 650° C. to 1150° C., from 650° C. to 1100° C., from 650° C. to 1050° C., from 650° C. to 1000° C., from 650° C. to 950° C., from 650° C. to 900° C., from 650° C. to 850° C., from 650° C. to 800° C., from 650° C. to 750° C., from 700° C. to 1500° C., from 750° C. to 1500° C., from 800° C. to 1500° C., from 850° C. to 1500° C., from 900° C. to 1500° C., from 950° C. to 1500° C., from 1000° C. to 1500° C., from 1050° C. to 1500° C., from 1100°

C. to 1500° C., from 1150° C. to 1500° C., from 1200° C. to 1500° C., from 1250° C. to 1500° C., from 1300° C. to 1500° C., from 1350° C. to 1500° C., or even from 1400° C. to 1500° C. A surface of at least a portion of the at least one OTA may comprise a molten layer for at least a portion of the contacting. Without intending to be bound by any particular theory, it is believed that higher temperatures increase the rate of the reaction, but the higher temperatures may also lead to changes in product selectivity. For example, higher temperatures may lead to formation of more aromatics and butadiene, coke, and COx.

Other parameters within the fluidized bed reactor include the gas hourly space velocity (GHSV), superficial gas velocity, and the amount of carrier gas required for keeping the OTA and fluidization enhancing additive in a fluidized state. The GHSV for the present process has been found to range from about 100 to about 150,000 normal cubic meters/hr of hydrocarbon feed per cubic meter of OTA and fluidization enhancing additive at bulk density ($h^{-1}$), such as from 1,000 $h^{-1}$ to 10,000 $h^{-1}$ or from 1,000 $h^{-1}$ to 5,000 $h^{-1}$. The OTA and fluidization enhancing additive may be pneumatically moved through the reaction system by a carrier fluid, such as an inert diluent fluid or one of the reactants in gaseous form. Examples of inert diluent carrier gases (also sometimes referred to as "superficial gas") are nitrogen, volatile hydrocarbons (for example, methane), steam, carbon dioxide, argon, and other carriers which do not interfere with the reaction. This list is not to be considered exhaustive. The carrier fluid (or superficial gas) velocity in the reactor during the reaction may be from 0.1 m/s to 25 m/s, such as from 0.5 m/s to 20 m/s, from 1 m/s to 15 m/s, or from 5 m/s to 15 m/s, depending upon the surface area of the reactor. The amount of carrier gas required is only that amount necessary to maintain the OTA and fluidization enhancing additive in a fluidized state. Preferably, the amount of carrier gas employed can range from about 0 kg gas to about 0.2 kg gas per kg OTA and fluidization enhancing additive. Alternatively, the OTA and fluidization enhancing additive may be transported through the reactor under sub-atmospheric pressure without diluent.

According to an aspect, either alone or in combination with any other aspect, a process for oxidative dehydrogenation of a hydrocarbon to produce an olefin and water includes contacting, in a fluidized bed, the hydrocarbon with a particulate material. The particulate material may include at least one oxygen transfer agent; and at least one fluidization enhancing additive consisting of inorganic materials. During at least a portion of the time of the contacting of the hydrocarbon with the particulate material, the fluidized bed is at a temperature at or above a melting point of one or more materials of the oxygen transfer agent. Further, during at least a portion of the time of the contacting of the hydrocarbon with the particulate material, a surface of at least a portion of the at least one oxygen transfer agent comprises a molten layer. The at least one fluidization enhancing additive does not undergo reduction in the fluidized bed during the contacting of the hydrocarbon with the particulate material at the temperature. The at least one fluidization enhancing additive is present in an amount that maintains sufficient fluidization of the particulate material.

According to a second aspect, either alone or in combination with any other aspect, the at least one oxygen transfer agent and the at least one fluidization enhancing additive are separate particles in the particulate material.

According to a third aspect, either alone or in combination with any other aspect, the particulate material comprises particles comprising the at least one oxygen transfer agent and the at least one fluidization enhancing additive.

According to a fourth aspect, either alone or in combination with any other aspect, the at least one oxygen transfer agent comprises a compound that undergoes reduction during the oxidative dehydrogenation thereby providing oxygen for formation of the water.

According to a fifth aspect, either alone or in combination with any other aspect, the at least one oxygen transfer agent comprises a mixed oxide comprising $Mg_6MnO_8$.

According to a sixth aspect, either alone or in combination with any other aspect, the at least one oxygen transfer agent further comprises at least two promoters comprising tungsten and an alkali metal, an alkaline earth metal, or a combination of the alkali metal and the alkaline earth metal.

According to a seventh aspect, either alone or in combination with any other aspect, the at least one oxygen transfer agent comprises: at least one reducible metal-containing oxide selected from the group consisting of manganese oxide, tin oxide, indium oxide, germanium oxide, lead oxide, antimony oxide, bismuth oxide, praseodymium oxide, terbium oxide, cerium oxide, iron oxide, ruthenium oxide, and a combination of two or more thereof; at least one alkali metal species, said alkali metal species comprising elemental alkali metal or a compound comprising the alkali metal; at least one boron-containing species, said boron-containing species comprising elemental boron or a compound comprising boron; and at least one alkaline earth metal-containing species, said alkaline earth metal-containing species comprising elemental alkaline earth metal or a compound comprising alkaline earth metal.

According to an eighth aspect, either alone or in combination with any other aspect, the at least one oxygen transfer agent comprises a mixed oxide of formula $ML_aB_bC_cO_x$, where M is selected from the group consisting of manganese, tin, indium, germanium, lead, antimony, bismuth, praseodymium, terbium, cerium, iron, ruthenium, and a combination of two or more thereof; L is at least one alkali metal; B is boron; C is at least one alkaline earth metal; O is oxygen; a is from 0.01 to 10; b is from 0.1 to 20; c is from 0.1 to 100; and x is a number of oxygen atoms required due to valence states of M, L, B, and C.

According to a ninth aspect, either alone or in combination with any other aspect, the at least one oxygen transfer agent comprises a mixed oxide of formula $MB_bC_cO_x$ where M is selected from the group consisting of manganese, tin, indium, germanium, lead, antimony, bismuth, praseodymium, terbium, cerium, iron, ruthenium, and a combination of two or more thereof; B is boron; C is at least one alkaline earth metal; O is oxygen; a is from 0.01 to 10; b is from 0.1 to 20; c is from 0.1 to 100; and x is a number of oxygen atoms required due to valence states of M, L, B, and C.

According to a tenth aspect, either alone or in combination with any other aspect, the oxygen transfer agent is perovskite.

According to an eleventh aspect, either alone or in combination with any other aspect, the oxygen transfer agent comprises $CaMnO_3$, $BaMnO_{3-\delta}$, $SrMnO_{3-\delta}$, $Mn_2SiO_4$, $Mn_2MgO_{4-\delta}$, $La_{0.8}Sr_{0.2}$, $La_{0.8}FeO_{3-\delta}$, $Ca_9Ti_{0.1}Mn_{0.9}O_{3-\delta}$, $Pr_6O_{11-\delta}$, or a combination of two or more thereof.

According to a twelfth aspect, either alone or in combination with any other aspect, the fluidized bed is at a temperature of at least 650° C. during at least a portion of the time of the contacting of the hydrocarbon with the particulate material.

According to a thirteenth aspect, either alone or in combination with any other aspect, the fluidized bed is at a temperature from 650° C. to 1500° C. during at least a portion of the time of the contacting of the hydrocarbon with the particulate material.

According to a fourteenth aspect, either alone or in combination with any other aspect, the fluidization enhancing additive is selected from the group consisting of non-reducible oxides, zeolites, clays, fluid catalytic cracking catalysts, and combinations of two or more thereof.

According to a fifteenth aspect, either alone or in combination with any other aspect, the fluidization enhancing additive comprises a non-reducible oxide comprising an inorganic material comprising a chemical species selected from the group consisting of alumina, silica, silicon carbide, metal carbide, metal nitride, titanium dioxide, alkaline earth metal oxide, alkali sulfate, alkaline earth sulfate, calcium sulfate, hydrates of calcium sulfate, alkali carbonate, alkaline earth carbonate, lanthanum oxide, rare earth metal oxide, boric acid, salts of boric acid, boric oxide, zinc oxide, cerium oxide, gallium oxide, and a combination of two or more thereof.

According to a sixteenth aspect, either alone or in combination with any other aspect, the fluidization enhancing additive comprises at least one zeolite of formula $M_{2/n}O \cdot Al_2O_3 \cdot ySiO_2 \cdot wH_2O$ where y is an integer from 2 to 1,000,000,000; n is a valence of a cationic portion of the at least one zeolite; M is a metal selected from the group consisting of Zr, Mg, Ti, and a combination of two or more thereof; and w is a number of water molecules per zeolite unit structure, such that at least 5% of n is due to proton charge.

According to a seventeenth aspect, either alone or in combination with any other aspect, the at least one zeolite of formula (3) is selected from the group consisting of zeolite Y, zeolite A, faujasite, bentonite, sodalite, ZSM-10, MCM-68, MCM-61, MCM-35, ZSM-39, ZSM-23, ZSM-12, SAPO 56, AlPO-5, AlPO-14, AlPO-41, and a combination of two or more thereof.

According to an eighteenth aspect, either alone or in combination with any other aspect, the fluidization enhancing additive comprises at least one fluid catalytic cracking catalyst.

According to a nineteenth aspect, either alone or in combination with any other aspect, the at least one fluid catalytic cracking catalyst is fresh.

According to a twentieth aspect, either alone or in combination with any other aspect, the at least one fluid catalytic cracking catalyst is equilibrated.

According to a twenty-first aspect, either alone or in combination with any other aspect, the at least one fluid catalytic cracking catalyst is stabilized by addition of one or more additives.

According to a twenty-second aspect, either alone or in combination with any other aspect, the one or more additives comprise lanthanum.

According to a twenty-third aspect, either alone or in combination with any other aspect, a weight ratio of the at least one oxygen transfer agent to the at least one fluidization enhancing additive is from 50:50 to 99:1.

One or more features of the present disclosure are illustrated in view of the examples as follows:

EXAMPLES

The following examples are illustrative in nature and should not serve to limit the scope of the present application.

Preliminary Considerations

For the following experiments, the fluidization enhancing additive included a zeolite of the formula $M_{2/n}O \cdot Al_2O_3 \cdot ySiO_2 \cdot wH_2O$ where y is an integer from 2 to 1,000,000,000; n is a valence of a cationic portion of the at least one zeolite; M is a metal selected from the group consisting of Zr, Mg, Ti, and a combination of two or more thereof; and w is a number of water molecules per zeolite unit structure, such that at least 5% of n is due to proton charge. An exemplary OTA, referred to as "OTA3" in the following examples, is sodium tungstate on the surface of $Mg_6MnO_8$. This OTA may be prepared as follows: MgO (1,692 g), $MnO_2$ (1,288 g), $H_3BO_3$ (452 g), $Na_4P_2O_7$ (1,481 g), ammonium metatungstate (258 g), and a 30% colloidal silica sol (858 g) were dry mixed. To this dry mix was added 5 l of distilled water. The mixture was spray dried to yield an average particle size of 70 μm. The resulting particles were air calcined at 950 C for 12 hours to produce the final OTA.

The OTA and fluidization enhancing additive were pre-mixed in a weight ratio of 50:50 to 90:10 OTA to fluidization enhancing additive.

Figure 2:
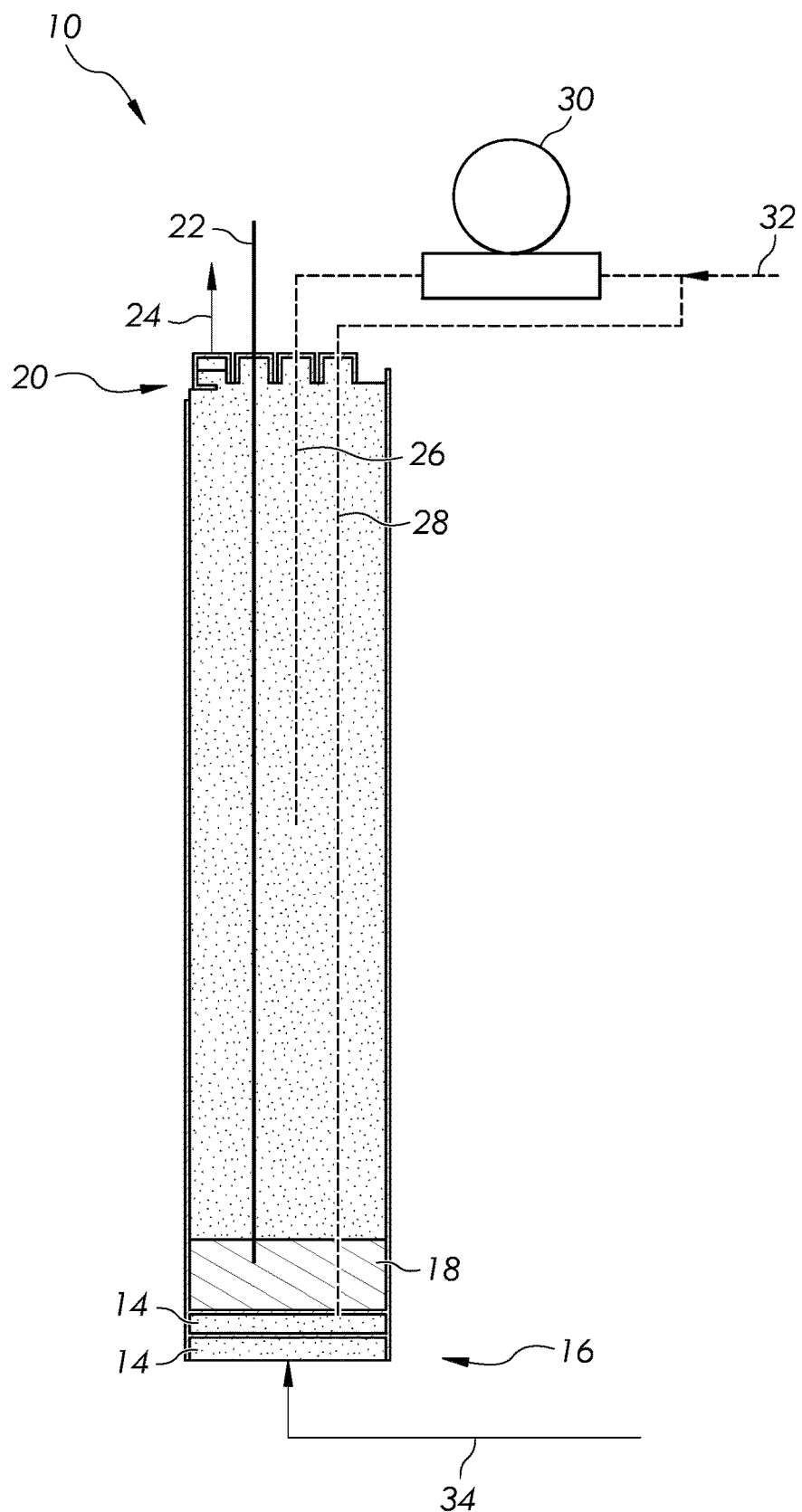
FIG. 2 is a schematic diagram of an apparatus for lab-scale fluidization experiments.

Lab-scale fluidization experiments were performed in a quartz, bubbling bed, up-flow reactor having a 2.54 cm (1 inch) internal diameter, such as that shown in FIG. 2. The reactor 10 may be capable of reaching temperatures up to 1100° C. The reactor is fitted with two medium frits 14 on the inlet side 16 for the catalyst mixture 18 to be loaded upon. There are four ports on the outlet side 20 for a 12-point thermocouple 22, gas outlet 24, and high leg 26 and low leg 28 of a differential pressure (DP) apparatus 30. A nitrogen blowback 32, operating at 10 sccm, on the high leg 26 of the DP prevents fines from contaminating the DP. Gases are supplied to the reactor by mass flow controllers through inlet 34 and a Camile data acquisition and control system is used to control rig operation.

In a typical room temperature fluidization experiment, the thermocouple and DP tubing are installed first, followed by loading of the OTA/fluidization enhancing additive mixture or pure materials. The pure materials are premixed and then poured into the reactor. The reactor is next examined for leakage and $N_2$ flow is initiated. DP is measured every 30 sec and the DP reading is acquired at each $N_2$ flow for three minutes. The $N_2$ flow rate typically ranges between 75 sccm and 4000 sccm. These experiments reveal fluidizability of materials (from DP readings) and also measures minimum fluidization velocity ($U_{mf}$) for fluidizable materials.

For high temperature experiments, DP is measured at various temperatures at constant superficial gas ($N_2$) velocity that is greater than $U_{mf}$. Thus, with increasing temperature the volumetric flow rate of $N_2$ is lowered to maintain constant superficial velocity. The temperature of the pure material or mixture is increased from room temperature to 300° C. at 5° C./min under $N_2$. DP is measured at temperatures between 300° C. and 1000° C. The DP reading is collected at each temperature for 1 hour and at 30 sec intervals.

Figure 3:
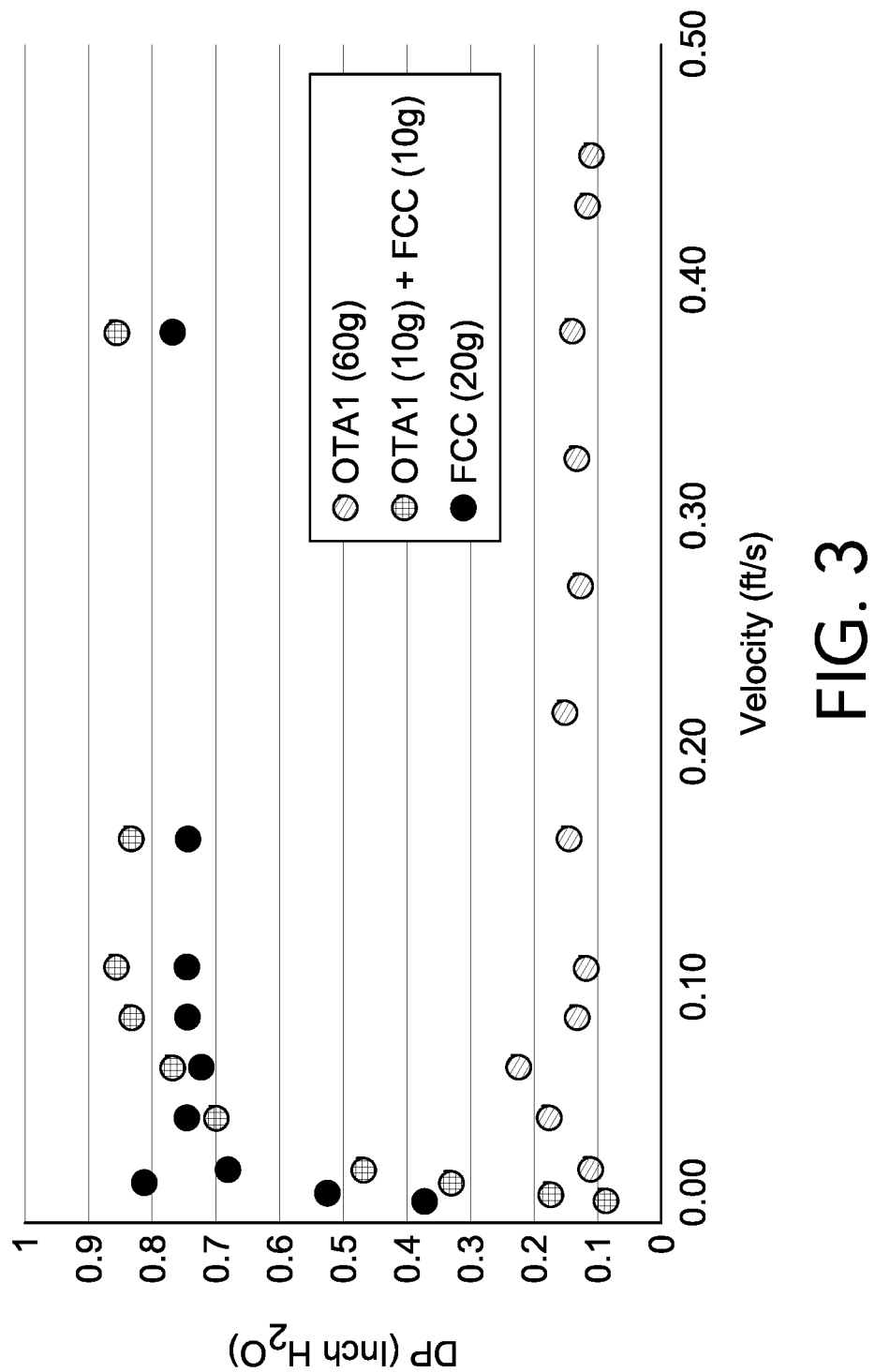
FIG. 3 is a chart of differential pressure versus superficial gas velocity from Example 1.

Example 1: Improving Fluidization 60 g of an OTA that exhibits a poor fluidization profile, OTA1, was loaded in the reactor and $N_2$ velocity was increased to 0.14 m/s. As shown in FIG. 3, which is a plot of DP vs. $N_2$ velocity, extremely low DP readings were recorded at all $N_2$ flow rates and the DP values did not change significantly with changing flow rates. This behavior is consistent with a material with a poor fluidization property.

Next, a mixture of 10 g OTA1 and 10 g FCC catalyst (as fluidization enhancing additive) was loaded in the reactor and $N_2$ velocity was increased to 0.12 m/s. As shown in FIG. 3, significantly higher DP readings were observed, even with lower material loading. The change in DP with gas velocity exhibited the following pattern. At low flow rates the system behaves like a fixed bed, where DP increases linearly with gas velocity until a maximum DP is reached. The gas velocity for maximum DP is the minimum fluidization velocity ($U_{mf}$) where the pressure drop equals the bed weight. Increasing gas velocity further ($>U_{mf}$) results in fluidization of the bed and the DP values remain almost constant at all subsequent gas velocities, as shown in FIG. 3. Bed fluidization/bubbling of the OTA1 and fluidization enhancing additive mixture was also confirmed visually at gas velocities $>U_{mf}$.

As a control experiment, 20 g pure FCC catalyst fluidization enhancement additive was loaded in the reactor and $N_2$ velocity was increased to 0.12 m/s. The DP readings with the FCC catalyst alone was similar to the OTA1+FCC catalyst system, as shown in FIG. 3. Thus, adding FCC catalyst to OTA1 significantly improved room temperature fluidization of OTA1, and the OTA1+FCC mixture behaved similarly to pure FCC catalyst from a fluidization perspective.

Figure 4:
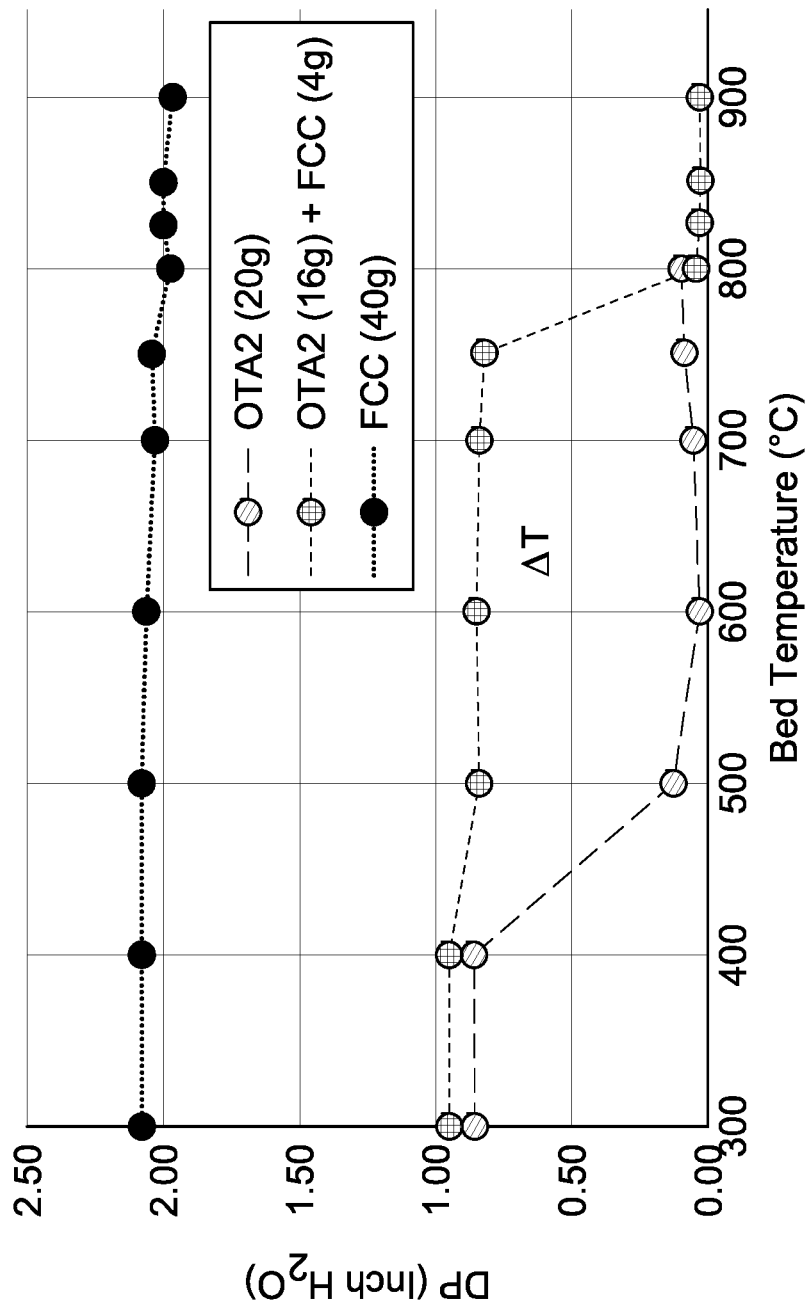
FIG. 4 is a chart of differential pressure versus bed temperature from Example 2.

Example 2: Increasing Reaction Temperature 20 g of an OTA that exhibits a good fluidization property at room temperature, OTA2, was loaded in the reactor. Fluidization of OTA2 (20 g) at temperatures between 300° C. and 800° C. was followed by measuring DP at each temperature at constant superficial gas ($N_2$) velocity. DP was unchanged at 300° C. and 400° C. and significantly lower at temperatures at and above 500° C., as shown in FIG. 4, a plot of DP vs. bed temperature. The lowering of DP at and above 500° C. is consistent with defluidization of OTA2, which results in channeling of gases. Thus, for oxidative dehydrogenation of hydrocarbons using OTA2, 500° C. is expected to be the temperature limit. For the process to be economically feasible for oxidative dehydrogenation of ethane, however, 500° C. is not sufficient and higher operating temperature is required. When 4 g FCC catalyst fluidization enhancing additive was mixed with 16 g OTA2, providing a weight ratio of the OTA to fluidization enhancing additive of 80:20, the DP did not change significantly between 300° C. and 750° C., followed by a significant lowering at 800° C., as shown in FIG. 4, a plot of DP vs. bed temperature. Pure FCC catalyst fluidization enhancing additive (40 g) did not show any signs of defluidization at temperatures up to 900° C., as shown in FIG. 4. Thus, adding a small amount of FCC catalyst fluidization enhancing additive to OTA2, results in an approximately 300° C. increase in operating temperature ("ΔT").

Example 3: Maintenance of the Reaction Yield

A 5 ml sample of OTA3, prepared as described above, was added to an alumina reactor having a 19 mm (0.75 inch) internal diameter. Ethane was converted over the OTA3 at 840° C. and GHSV of 4,000 $h^{-1}$ to 4,800 $h^{-1}$ with the conversion results shown in Table 1. The catalyst bed defluidized at approximately 810° C.

TABLE 1

| | Conversion results with OTA only (Comparative) | | | | | |
|---|---|---|---|---|---|---|
| Parameter | Chemical Species | Trial 1 | Trial 2 | Trial 3 | Trial 4 | Trial 5 |
| Temp. (° C.) | — | 840 | 840 | 840 | 840 | 840 |
| GHSV ($h^{-1}$) | — | 4,800 | 4,800 | 4,000 | 4,000 | 4,000 |
| % Selectivity | Methane | 7.66 | 8.21 | 9.04 | 9.11 | 8.95 |
| | Ethylene | 80.71 | 82.14 | 78.37 | 78.54 | 79.27 |
| | Acetylene | 0.77 | 0.73 | 0.88 | 0.87 | 0.85 |
| | Propylene | 2.04 | 2.04 | 2.13 | 2.13 | 2.13 |
| | Propane | 0.33 | 0.33 | 0.30 | 0.30 | 0.31 |
| | Propadiene | 0.04 | 0.03 | 0.04 | 0.04 | 0.04 |
| | Methyl acetylene | 0.20 | 0.18 | 0.23 | 0.22 | 0.22 |
| | $C_4$ species | 4.01 | 3.83 | 4.34 | 4.33 | 4.32 |
| | $C_5$ species | 0.79 | 0.71 | 0.99 | 1.00 | 1.04 |
| | $C_6$ and greater species | 0.92 | 0.26 | 1.61 | 1.50 | 1.39 |
| | Coke | trace | trace | trace | trace | Trace |
| % Conversion | Ethane | 73.59 | 70.54 | 79.21 | 79.08 | 78.16 |
| % Selectivity | $C_2$ and greater species | 89.80 | 90.27 | 88.89 | 88.93 | 89.56 |
| % Yield | $C_2$ and greater species | 66.09 | 63.68 | 70.41 | 70.33 | 70.00 |
| % Selectivity | Carbon dioxide | 1.74 | 0.98 | 1.32 | 1.24 | 0.89 |
| | Carbon monoxide | 0.80 | 0.54 | 0.75 | 0.72 | 0.60 |
| % Yield | Carbon dioxide | 1.28 | 0.69 | 1.05 | 0.98 | 0.70 |
| | Carbon monoxide | 0.59 | 0.38 | 0.59 | 0.57 | 0.47 |
| % Selectivity | $H_2$ | 29.62 | 42.15 | 31.70 | 32.54 | 38.93 |
| | $H_2O$ | 70.38 | 57.85 | 68.30 | 67.46 | 61.07 |

Next, a 5 ml sample of OTA3 was charged to an identical alumina reactor that also contained 5 ml of an equilibrated FCC catalyst fluidization enhancing additive. Ethane conversion runs were made at 840° C. with the conversion results shown in Table 2. The GHSV was calculated based on the amount of OTA3. There was no sign of any catalyst defluidization at 840° C. Thus, these two experiments demonstrate that the addition of a FCC catalyst fluidization enhancing additive greatly improved the fluidization of the reactor components at the desired 840° C. conversion temperature and that the addition of the additive did not adversely affect the overall yields of the desired olefin products.

TABLE 2

Conversion results with OTA and FCC catalyst fluidization enhancing additive

| Parameter | Chemical Species | Trial 1 | Trial 2 | Trial 3 | Trial 4 | Trial 5 | Trial 6 |
|---|---|---|---|---|---|---|---|
| Temp. (° C.) | — | 840 | 840 | 840 | 840 | 840 | 840 |
| GHSV ($h^{-1}$) | — | 2,400 | 3,000 | 3,000 | 2,400 | 2,400 | 2,400 |
| % Selectivity | Methane | 9.46 | 8.51 | 8.99 | 10.04 | 10.36 | 12.39 |
| | Ethylene | 59.28 | 70.06 | 71.51 | 68.00 | 69.92 | 61.35 |
| | Acetylene | 1.49 | 1.00 | 0.93 | 1.04 | 1.05 | 0.75 |
| | Propylene | 1.50 | 1.78 | 1.74 | 1.68 | 1.75 | 1.72 |
| | Propane | 0.11 | 0.21 | 0.25 | 0.22 | 0.23 | 0.17 |
| | Propadiene | 0.05 | 0.04 | 0.03 | 0.03 | 0.03 | 0.02 |
| | Methyl acetylene | 0.18 | 0.14 | 0.11 | 0.11 | 0.11 | 0.08 |
| | $C_4$ species | 4.17 | 4.33 | 3.84 | 3.83 | 3.89 | 2.00 |
| | $C_5$ species | 0.49 | 0.47 | 0.58 | 0.42 | 0.46 | 0.45 |
| | $C_6$ and greater species | 10.46 | 7.32 | 5.96 | 7.12 | 5.60 | 6.89 |
| | Coke | trace | trace | trace | trace | Trace | Trace |
| % Conversion | Ethane | 93.73 | 84.43 | 80.25 | 84.67 | 84.15 | 87.31 |
| % Selectivity | $C_2$ and greater species | 77.73 | 85.34 | 84.94 | 82.45 | 83.04 | 73.44 |
| % Yield | $C_2$ and greater species | 72.85 | 72.05 | 68.17 | 69.81 | 69.88 | 64.12 |
| % Selectivity | Carbon dioxide | 7.45 | 3.64 | 4.20 | 5.22 | 4.47 | 7.53 |
| | Carbon monoxide | 5.37 | 2.52 | 1.87 | 2.29 | 2.13 | 6.64 |
| % Yield | Carbon dioxide | 6.98 | 3.07 | 3.37 | 4.42 | 3.76 | 6.58 |
| | Carbon monoxide | 5.03 | 2.13 | 1.50 | 1.94 | 1.80 | 5.79 |
| % Selectivity | $H_2$ | 9.13 | 21.53 | 38.38 | 34.91 | 39.30 | 26.94 |
| | $H_2O$ | 90.87 | 78.47 | 61.62 | 65.09 | 60.70 | 73.06 |

Example 4: Pilot-Scale Oxidative Dehydrogenation

Figure 5:
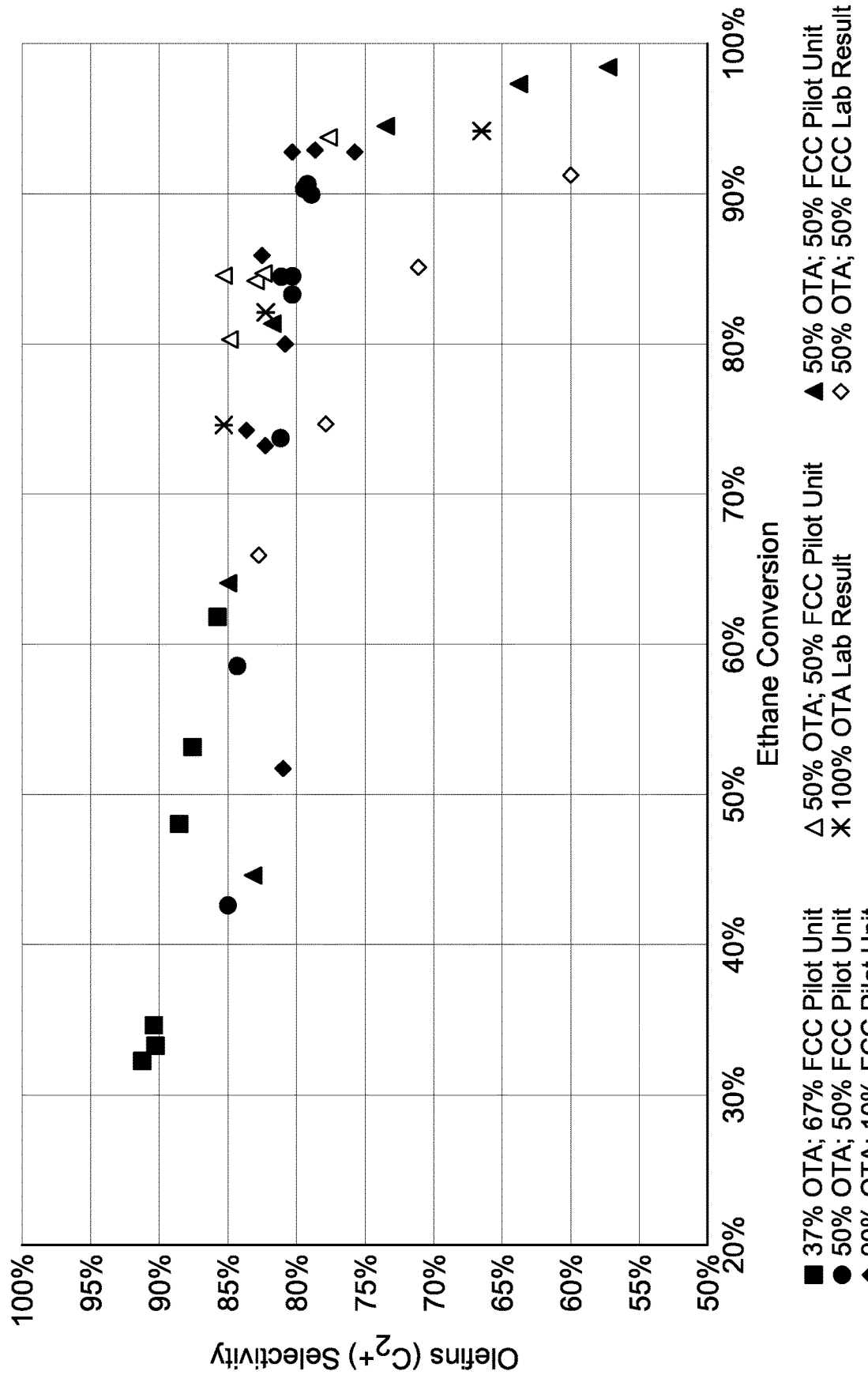
FIG. 5 is a chart of ethane conversion vs. olefin selectivity from Example 4.

FIG. 5, a plot of ethane conversion vs. olefin selectivity, shows the results of ethane oxidative dehydrogenation runs using 5 kg to 8 kg of total OTA and FCC catalyst fluidization enhancing additive in a continuous circulating fluid bed pilot unit reactor. An OTA, which was similar to OTA3, was mixed with the FCC catalyst fluidization enhancing additive in mixtures having a weight ratio of OTA to FCC catalyst fluidization enhancing additive from 100:0 to 50:50. The results shown in FIG. 5, obtained from pilot-scale experiments, indicate that the pilot-scale reactors provide conversion and selectivity similar to the results from the lab-scale experiments provided in Tables 1 and 2. In addition, including between 10% and 50% of the FCC catalyst fluidization enhancing additive to the pilot-scale reactor allowed for reaction temperatures up to 825° C.

It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalences.

The invention claimed is:

1. A process for dehydrogenation of a hydrocarbon to produce an olefin and water, the process comprising:
contacting, in a fluidized bed, the hydrocarbon with a particulate material consisting of:
an oxygen transfer agent; and
a fluidization enhancing additive consisting of inorganic materials;
wherein:
during at least a portion of the time of the contacting of the hydrocarbon with the particulate material, the fluidized bed is at a temperature at or above a melting point of one or more materials of the oxygen transfer agent;
during at least a portion of the time of the contacting of the hydrocarbon with the particulate material, a surface of at least a portion of the oxygen transfer agent is exposed to a temperature near or greater than the melting point of the material of the oxygen transfer agent such that at least a portion of the oxygen transfer agent comprises a molten layer;
the fluidization enhancing additive does not undergo reduction in the fluidized bed during the contacting of the hydrocarbon with the particulate material at the temperature;
the fluidization enhancing additive is present in an amount that maintains sufficient fluidization of the particulate material; and
the oxygen transfer agent and the fluidization enhancing additive are separate particles in the particulate material.

2. The process of claim 1, wherein the oxygen transfer agent comprises a compound that undergoes reduction during the dehydrogenation thereby providing oxygen for formation of the water.

3. The process of claim 1, wherein the oxygen transfer agent is a mixed oxide comprising $Mg_6MnO_8$.

4. The process of claim 3, wherein the oxygen transfer agent further comprises at least two promoters comprising tungsten and an alkali metal, an alkaline earth metal, or a combination of the alkali metal and the alkaline earth metal.

5. The process of claim 1, wherein the oxygen transfer agent comprises:
at least one reducible metal-containing oxide selected from the group consisting of manganese oxide, tin oxide, indium oxide, germanium oxide, lead oxide, antimony oxide, bismuth oxide, praseodymium oxide, terbium oxide, cerium oxide, iron oxide, ruthenium oxide, and a combination of two or more thereof;

at least one alkali metal species, said alkali metal species comprising elemental alkali metal or a compound comprising the alkali metal;

at least one boron-containing species, said boron-containing species comprising elemental boron or a compound comprising boron; and at least one alkaline earth metal-containing species, said alkaline earth metal-containing species comprising elemental alkaline earth metal or a compound comprising alkaline earth metal.

6. The process of claim 5, wherein the oxygen transfer agent comprises a mixed oxide of formula (1):

$$ML_aB_bC_cO_x \qquad (1)$$

where

M is selected from the group consisting of manganese, tin, indium, germanium, lead, antimony, bismuth, praseodymium, terbium, cerium, iron, ruthenium, and a combination of two or more thereof;

L is at least one alkali metal;

B is boron;

C is at least one alkaline earth metal;

O is oxygen;

a is from 0.01 to 10;

b is from 0.1 to 20;

c is from 0.1 to 100; and x is a number of oxygen atoms required due to valence states of M, L, B, and C.

7. The process of claim 5, wherein the oxygen transfer agent comprises a mixed oxide of formula (2):

$$MB_bC_cO_x \qquad (2)$$

where

M is selected from the group consisting of manganese, tin, indium, germanium, lead, antimony, bismuth, praseodymium, terbium, cerium, iron, ruthenium, and a combination of two or more thereof;

B is boron;

C is at least one alkaline earth metal;

O is oxygen;

a is from 0.01 to 10;

b is from 0.1 to 20;

c is from 0.1 to 100; and x is a number of oxygen atoms required due to valence states of M, L, B, and C.

8. The process of claim 1, wherein the oxygen transfer agent is perovskite.

9. The process of claim 1, wherein during at least a portion of the time of the contacting of the hydrocarbon with the particulate material, the fluidized bed is at a temperature from 650° C. to 1500° C.

10. The process of claim 1, wherein the fluidization enhancing additive is selected from the group consisting of non-reducible oxides, zeolites, clays, fluid catalytic cracking catalysts, and combinations of two or more thereof.

11. The process of claim 1, wherein the fluidization enhancing additive comprises a non-reducible oxide comprising an inorganic material comprising a chemical species selected from the group consisting of alumina, silica, silicon carbide, metal carbide, metal nitride, titanium dioxide, alkaline earth metal oxide, alkali sulfate, alkaline earth sulfate, calcium sulfate, hydrates of calcium sulfate, alkali carbonate, alkaline earth carbonate, boric acid, salts of boric acid, boric oxide, zinc oxide, cerium oxide, gallium oxide, and a combination of two or more thereof.

12. The process of claim 1, wherein the fluidization enhancing additive comprises at least one zeolite of formula (3):

$$M_{2/n}O \cdot Al_2O_3 \cdot ySiO_2 \cdot wH_2O \qquad (3)$$

where y is an integer from 2 to 1,000,000,000;

n is a valence of a cationic portion of the at least one zeolite of formula (3);

M is a metal selected from the group consisting of Zr, Mg, Ti, and a combination of two or more thereof; and w is a number of water molecules per zeolite unit structure, such that at least 5% of n is due to proton charge.

13. The process of claim 1, wherein the fluidization enhancing additive comprises at least one fluid catalytic cracking catalyst.

14. The process of claim 13, wherein the at least one fluid catalytic cracking catalyst is stabilized by addition of one or more additives.

15. The process of claim 1, wherein a weight ratio of the oxygen transfer agent to the fluidization enhancing additive is from 50:50 to 99:1.

16. The process of claim 1, wherein the oxygen transfer agent comprises:

an alkali metal and at least one of a mixed oxide of at least one metal that, when contacted with a hydrocarbon, is capable of oxidizing the hydrocarbon to a more unsaturated state or that couples carbon-carbon bonds with the formation of water as in reaction scheme (1):

$$zC_nH_{2n+2-2\beta}+(z-1+\delta)[O] \rightarrow C_{z \times n}H_{2(z \times n)+2-2\beta-2\delta}+(z-1+\delta)H_2O \qquad (1)$$

where z equals the number of reacting paraffin molecules, n equals the number of atomic units in the reacting molecule, β equals the degree of unsaturation where the value is zero for single bonds, one for double bonds and molecular rings, and two for triple bonds, and δ equals the change in the degree of unsaturation; and a mixed oxide of at least one metal that, when contacted with hydrogen, is capable of hydrogen oxidation.

17. The process of claim 1, wherein a weight ratio of the oxygen transfer agent to the fluidization enhancing additive is from 60:40 to 99:1.

18. The process of claim 1, wherein a weight ratio of the oxygen transfer agent to the fluidization enhancing additive is from 70:30 to 99:1.

19. The process of claim 1, wherein fluidization in the fluidized bed refers to gas-solid flow regimes chosen from expanded bed, minimum fluidization, smooth fluidization, bubbling fluidization, slugging fluidization, a turbulent fluidization, dense phase fluidization, spouting bed fluidization, channeling, lean phase fluidization, fast fluidization, or dilute transport fluidization.

20. A process for dehydrogenation of a hydrocarbon to produce an olefin and water, the process comprising:

contacting, in a fluidized bed, the hydrocarbon with a particulate material consisting of:

an oxygen transfer agent; and a fluidization enhancing additive consisting of inorganic materials;

wherein:

the fluidization enhancing additive comprises:

at least one fluid catalytic cracking catalyst;

at least one zeolite of formula (3):

$$M_{2/n}O \cdot Al_2O_3 \cdot ySiO_2 \cdot wH_2O \qquad (3)$$

where:

y is an integer from 2 to 1,000,000,000;

n is a valence of a cationic portion of the at least one zeolite of formula (3);

M is a metal selected from the group consisting of Zr, Mg, Ti, and a combination of two or more thereof; and w is a number of water molecules per zeolite unit structure, such that at least 5% of n is due to proton charge;

or both;

during at least a portion of the time of the contacting of the hydrocarbon with the particulate material, the fluidized bed is at a temperature at or above a melting point of one or more materials of the oxygen transfer agent;

during at least a portion of the time of the contacting of the hydrocarbon with the particulate material, a surface of at least a portion of the oxygen transfer agent is exposed to a temperature near or greater than the melting point of the material of the oxygen transfer agent such that at a least portion of the oxygen transfer agent comprises a molten layer;

the fluidization enhancing additive does not undergo reduction in the fluidized bed during the contacting of the hydrocarbon with the particulate material at the temperature;

the fluidization enhancing additive is present in an amount that maintains sufficient fluidization of the particulate material; and a weight ratio of the oxygen transfer agent to the fluidization enhancing additive is from 60:40 to 99:1.

* * * * *